Aug. 8, 1933.   C. A. DE GIERS   1,920,971
LIQUID LEVEL GAUGE WITH DIAPHRAGM SEAL
Filed Jan. 16, 1930   2 Sheets-Sheet 1
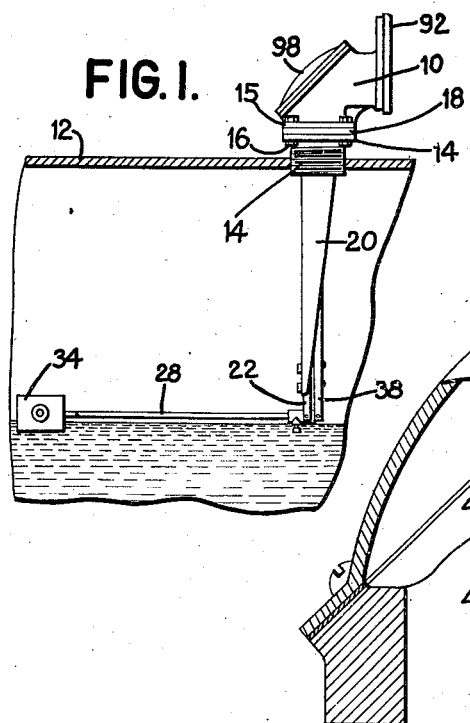
FIG. 1.
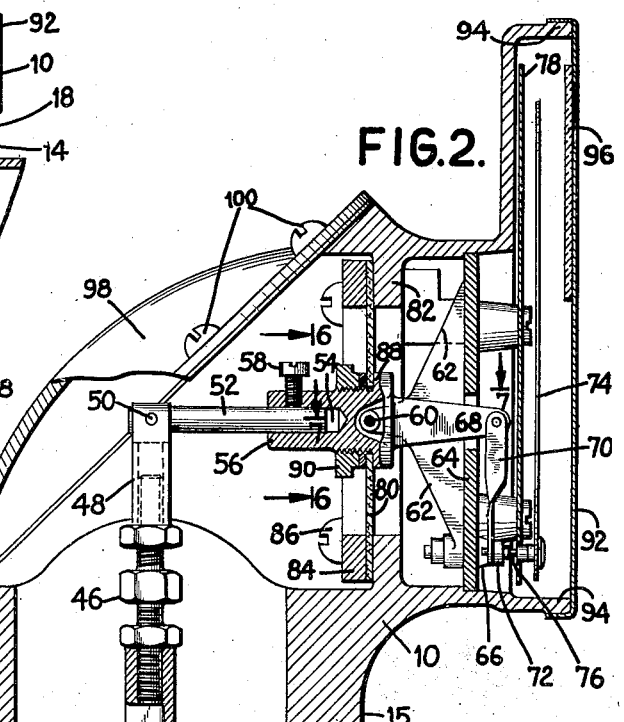
FIG. 2.
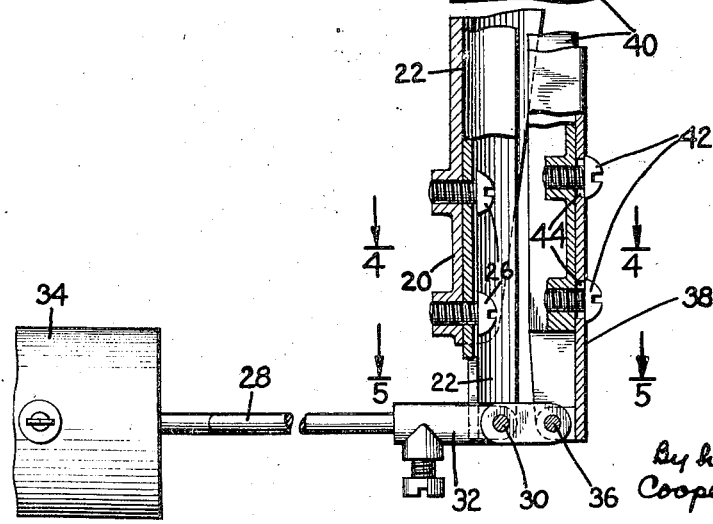
Inventor
C. A. de Giers
By his attorneys
Cooper, Kerr & Dunham Aug. 8, 1933.   C. A. DE GIERS   1,920,971
LIQUID LEVEL GAUGE WITH DIAPHRAGM SEAL
Filed Jan. 16, 1930   2 Sheets-Sheet 2
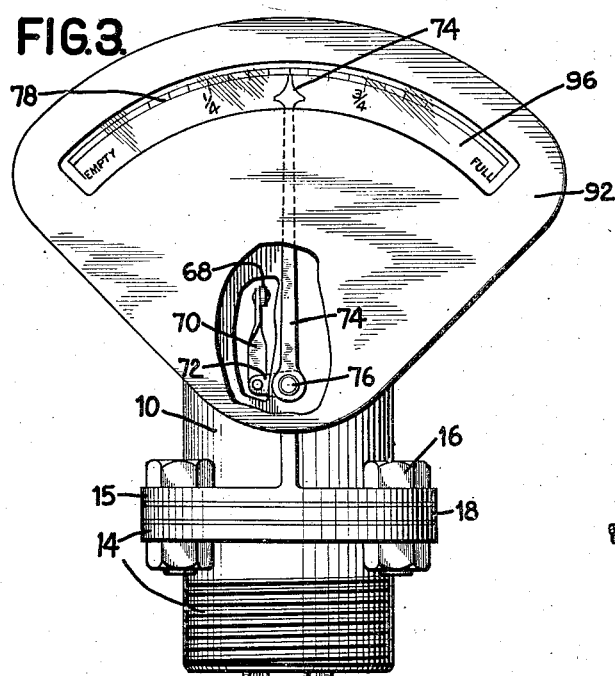
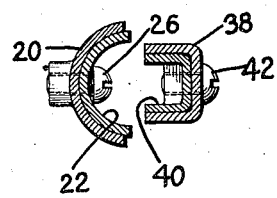
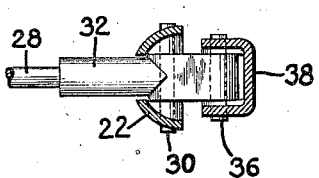
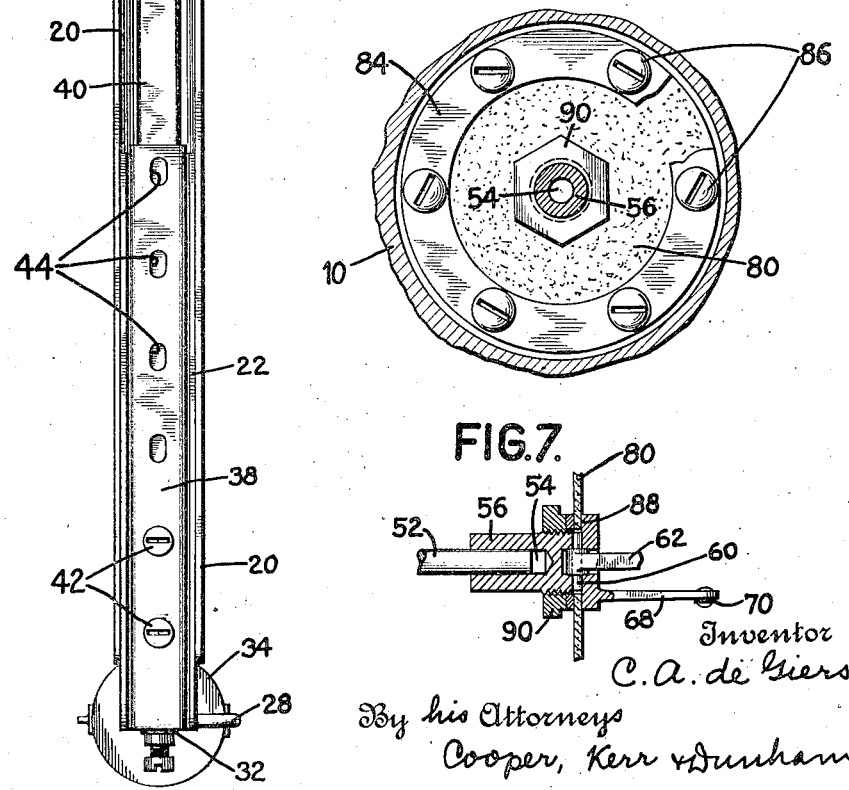
Inventor
C. A. de Giers
By his Attorneys
Cooper, Kerr & Dunham Patented Aug. 8, 1933

1,920,971

UNITED STATES PATENT OFFICE 1,920,971

LIQUID LEVEL GAUGE WITH DIAPHRAGM SEAL

Clarence A. de Giers, Forest Hills, N. Y., assignor, by mesne assignments, to Richard C. Murphy, New York, N. Y.

Application January 16, 1930. Serial No. 421,323

6 Claims. (Cl. 73—82)

This invention pertains to gauges for indicating the amount of liquid in tanks, the principal object of the invention being to disclose a simple and inexpensive, but thoroughly reliable, float-actuated gauge especially adapted for use on oil burner tanks in the basements of houses.

Further and other objects and advantages will be apparent from the accompanying specifications and claims, and from the drawings which illustrate what is now considered the preferred form of the invention.

Fig. 1 is a view of the gauge installed on a tank, the tank being mostly broken away.

Fig. 2 is an enlarged cross-section of the instrument.

Fig. 3 is a front view of the instrument from the right side of Fig. 2.

Fig. 4 is a cross-section on the line 4—4 of Fig. 2.

Fig. 5 is a cross section on line 5—5 of Fig. 2.

Fig. 6 is a view on line 6—6 of Fig. 2.

Fig. 7 is a detail cross-section on the line 7—7 of Fig. 2.

The frame or housing of the gauge is designated 10, mounted in operative position on the tank 12 by means of a threaded flange 14, secured to the lower flange 15 of housing 10 by screws 16. Pinched between flange 14 and housing 10 is the flange 18 of hanger 20, which projects downwardly into the tank and has a semicircular channel cross section as shown in Fig. 4. Hanger 20 is adjustable as to length by means of an internal channel shaped extension 22 provided with a number of holes, through any adjacent pair of which pass two screws 26 to secure the extension to hanger 20. The float arm 28 is fulcrumed by pin 30 on the lower end of extension 22 and the above described arrangement affords a ready means for positioning the float in tanks of varying depths. The float arm is provided at its pivoted end with a socket 32 and at its free end with a float 34.

Pivoted by a pin 36 on the end of float arm socket 32 is an upwardly extending channel shaped link formed of lower and upper sections 38 and 40 bolted together by screws 42 through slots 44 in section 40 so that the link may be adjusted in length to correspond with the length of hanger 20—22.

The upper end of link 38—40 is provided with an upwardly extending turnbuckle 46, on the upper end of which is threaded a socket 48. To the upper end of the socket is pivoted at 50, a horizontal arm 52. Turnbuckle 46 serves to closely adjust the length of the vertical link 38—40 whereby the position of arm 52 may be set with relation to float arm 28.

Arm 52 enters the bore 54 of a fitting 56 and is held therein by screw 58. Fitting 56 is pivotally mounted on a horizontal pin 60 supported on a bracket 62 which is integral with a flange 64 secured by screws 66 to housing 10. Extending from fitting 56 in the opposite direction from arm 52 is an arm or extension 68, from the free end of which hangs the vertical link 70. The lower end of link 70 is connected by a short horizontal arm 72, secured to the lower end of upwardly extending hand or pointer 74, mounted for rotation on pin 76.

From the above description it will be appreciated that the assembly comprising arm 52, fitting 56 and extension 68 is simply a lever movable about pivot 60 to positions corresponding to positions of the float and therefore corresponding to the amount of liquid in the tank. Pointer 74, being operatively connected to lever 52—56—68, also moves in harmony with the float and indicates on graduated chart 78 the contents of the tank.

When the tank is empty and the float is at its lowest position, pointer 74 is set to the zero position on the chart, by means of turnbuckle 46. Then the tank is filled, and if the indication of the pointer on the chart is not right, correction is made by sliding arm 52 in or out of socket 54, to thereby change the effective length of arm 52.

In order to protect the chart, pointer, and pointer-actuating devices, from moisture, vapor or gases arising from the liquid in the tank, means is provided for hermetically sealing the tank from the indicator. The sealing means comprises an annular diaphragm 80 of rubber, leather, metal or other suitable material, clamped at its outer rim to an internal flange 82 of housing 10, by means of ring 84 and screws 86, and clamped at its inner rim to shoulder 88 of fitting 56 by hexagon collar 90 threaded on fitting 56. Inasmuch as fitting 56 passes through the diaphragm and at the same time rocks or oscillates relatively to the diaphragm, it has been found advantageous to locate the diaphragm in a vertical plane containing the axis of pin 60 upon which fitting 56 is fulcrumed, thereby reducing to a negligible amount the flexure of the diaphragm.

The chart chamber is closed from the atmosphere on its front side by means of a cover 92 fitted around flange 94 of the housing and provided with an opening covered by glass 96 through which the pointer and chart may be observed. A plate 98 secured by screws 100 serves to enclose the rear of the housing. This plate when removed provides access to turnbuckle 46 and arm 52 for purposes of adjustment.

It is to be understood that the invention is not limited to the specific construction herein illustrated and described but may be used in other ways without departure from its spirit as defined by the following claims.

I claim—

1. In a gauge for indicating the amount of liquid in a tank, means for supporting the gauge on the top of the tank, a channel shaped hanger depending from the gauge into the tank, means comprising an overlapping and interfitting extension of said hanger whereby the operative length of said hanger is changed to accommodate tanks of various depths, a float arm, means for pivotally supporting said arm on said extension, a link passing vertically through the hanger channel and connecting said float arm with said gauge whereby said gauge is caused to indicate the position of said float arm.

2. In a gauge for indicating the depth of liquid in a tank, a housing for the gauge, a diaphragm separating said housing into two compartments, indicating devices in one compartment, a lever passing through said diaphragm from one compartment to the other for operating said indicating devices, and means within the compass of said diaphram for pivotally supporting said lever.

3. In a gauge for indicating the depth of liquid in a tank, a housing for the gauge, a diaphragm separating said housing into two compartments, indicating devices in one compartment, a movable device in the other compartment, and a lever operatively connecting said movable device to said indicating devices, said lever passing through said diaphragm and being supported by a pivot within the compass of said diaphragm.

4. In a gauge for indicating the depth of liquid in a tank, a housing for the gauge, a lever in said housing, a horizontal pivot for said lever, a vertical annular diaphragm encompassing said pivot, means for supporting said diaphragm at its outer edge on said housing and at its inner edge on said lever, whereby said diaphragm separates said housing into two compartments hermetically sealed from each other, and indicating devices in one compartment operated by said lever.

5. In a gauge for indicating the depth of liquid in a tank, means for securing said gauge to a tank, said gauge comprising a housing, an indicator within the housing, a diaphragm within the housing and cooperating with the tank to divide the housing into two closed compartments, one of which contains the indicator, float operated mechanism in the tank and the other compartment and extending through said diaphragm to operate said indicator, and mechanism within said other compartment for adjusting the float mechanism in accordance with the contents of the tank, said mechanism being operable without entering the tank.

6. In combination, a tank and a gauge for indicating the depth of liquid in said tank comprising a housing, an indicator within the housing, a diaphragm within the housing and cooperating with the tank to divide the housing into tank and indicator compartments, the latter of which contains the indicator, float operated mechanism in the tank compartment extending through said diaphragm into the indicator compartment and connected to operate said indicator, means in the tank compartment for adjusting the float operated mechanism in accordance with the contents of the tank and the position of the indicator, and a closure member on the housing for closing the tank compartment and permitting access to the adjusting means without entering the tank.

CLARENCE A. DE GIERS.